US007738869B2

(12) United States Patent
Son et al.

(10) Patent No.: US 7,738,869 B2
(45) Date of Patent: Jun. 15, 2010

(54) SYSTEM AND METHOD FOR CONTROLLING IDLE MODE IN A BROADBAND WIRELESS ACCESS COMMUNICATION SYSTEM

(75) Inventors: Yeong-Moon Son, Anyang-si (KR); Chang-Hoi Koo, Seongnam-si (KR); Hong-Sung Chang, Suwon-si (KR); Jung-Je Son, Seongnam-si (KR); Sung-Jin Lee, Suwon-si (KR); Hyun-Jeong Kang, Seoul (KR); Hyoung-Kyu Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 355 days.

(21) Appl. No.: 11/328,795

(22) Filed: Jan. 10, 2006

(65) Prior Publication Data
US 2006/0154663 A1    Jul. 13, 2006

(30) Foreign Application Priority Data
Jan. 10, 2005   (KR)  ...................... 10-2005-0002317

(51) Int. Cl.
H04W 4/00    (2009.01)
G08C 17/00   (2006.01)

(52) U.S. Cl. .................................. 455/435.1; 370/311
(58) Field of Classification Search .............. 455/435.1; 370/311
See application file for complete search history.

(56) References Cited
U.S. PATENT DOCUMENTS
6,075,776 A * 6/2000 Tanimoto et al. ............ 370/254

2002/0128037 A1* 9/2002 Schmidt ..................... 455/553
2003/0114113 A1* 6/2003 Kornprobst .................. 455/69
2004/0218556 A1* 11/2004 Son et al. .................... 370/311
2005/0036464 A1   2/2005 Rajkotia et al.
2005/0054389 A1   3/2005 Lee et al.
2005/0250474 A1   11/2005 Hong et al.
2006/0084453 A1* 4/2006 Kim et al. ................... 455/517
2007/0184824 A1* 8/2007 Nylander et al. ......... 455/422.1

FOREIGN PATENT DOCUMENTS

| RU | 2209516 | 7/2003 |
|---|---|---|
| WO | WO 02/45456 | 6/2002 |
| WO | WO 02/063912 | 8/2002 |
| WO | WO 03/045076 | 5/2003 |
| WO | WO 2006/038781 | 4/2006 |

OTHER PUBLICATIONS

Part 16: Air Interface for Fixed Broadband Wireless Access Systems, IEEE P802.16-REVd/D5-2004, IEEE Wirelessman 802.16, XP 002560879, May 13, 2004.

* cited by examiner

Primary Examiner—Vincent P Harper
Assistant Examiner—Marisol Figueroa
(74) Attorney, Agent, or Firm—The Farrell Law Firm, LLP

(57) ABSTRACT

A method for controlling an idle mode in a broadband wireless access (BWA) communication system. A mobile station (MS) transmits to a base station (BS) a de-registration request (DREG-REQ) indicating a state transition request to the idle mode. The BS transmits to the MS a de-registration command (DREG-CMD) for commanding state transition to the idle mode. The MS transmits to the BS a de-registration acknowledgement (DREG-ACK) in response to the DREG-CMD.

17 Claims, 9 Drawing Sheets

SYSTEM AND METHOD FOR CONTROLLING IDLE MODE IN A BROADBAND WIRELESS ACCESS COMMUNICATION SYSTEM

PRIORITY

This application claims the benefit under 35 U.S.C. § 119 (a) of application filed in the Korean Intellectual Property Office on Jan. 10, 2005 and assigned Serial No. 2005-2317, the entire contents of which are hereby incorporated by reference.

BACKGROUND OF THE INVENTION

1. Field of the Invention

The present invention relates generally to a Broadband Wireless Access (BWA) communication system, and in particular, to a system and method for controlling a state transition of a mobile station having an idle mode.

2. Description of the Related Art

Extensive research into the $4^{th}$ generation (4G) communication system, which is the next generation communication system, is being conducted to provide users with services that guarantee various qualities-of-service (QoS) at a data rate of about 100 Mbps. In particular, much of the research the 4G communication system is being carried out to support a high-speed service that guarantees mobility and QoS for BWA communication systems such as a wireless Local Area Network (LAN) system and a wireless Metropolitan Area Network (MAN) system. A system based on the Institute of Electrical and Electronics Engineers (IEEE) 802.16 standard (an IEEE 802.16 communication system) is one of the typical BWA communication systems.

The IEEE 802.16 communication system is specified as a communication system employing an Orthogonal Frequency Division Multiplexing (OFDM) scheme and/or an Orthogonal Frequency Division Multiple Access (OFDMA) scheme (hereinafter referred to as an "OFDM/OFDMA communication system") to support a broadband transmission network for physical channels of the wireless MAN system.

According to IEEE 802.16 standard, if there is no transmission/reception traffic for a preset amount of time, a mobile station (MS) can operate in an idle mode to minimize power consumption. Therefore, if there is no traffic, the MS transmits a De-Registration Request (DREG-REQ) message to a serving base station (BS) with which it is currently communicating, in order to operate in the idle mode. Upon receiving the DREG-REQ message, the serving BS transmits a De-Registration Command (DREG-CMD) message to the MS to approve a transition operation to the idle mode. Formats of the DREG-REQ and DREG-CMD messages are shown in Table 1 and Table 2, respectively.

TABLE 1

| Syntax | Size | Notes |
|---|---|---|
| DREG-REQ message format( ) { | | |
| Management message type=49 | 8 bits | |
| De-Registration_Request_Code | 8 bits | 0x00=MSS De-Registration request from BS and network 0x01=request for MS De-Registration from serving BS and initiation of MS Idle Mode |

TABLE 1-continued

| Syntax | Size | Notes |
|---|---|---|
| TLV encoded parameters<br>} | variable | 0x02-0xFF= Reserved |

As shown in Table 1, in the DREG-REQ message, a Management Message Type field is used for identifying Medium Access Control (MAC) management messages defined in the IEEE 802.16 standard. A De-Registration_Request_Code field is used to indicate the purpose for a MS to transmit the DREG-REQ message. A Type/Length/Value (TLV) encoded parameters field includes parameter information for authenticating MSs based on information of a security association (SA) made between the MSs and the serving BS.

TABLE 2

| Syntax | Size |
|---|---|
| DREG-CMD_Message_Format( ) { | |
| Management Message Type | 8 bits |
| Action Code | 8 bits |
| TLV_Paging Information | 48 bits |
| TLV_REG-duration | 24 bits |
| TLV_HMAC Tuple<br>} | 176 bits |

As shown in Table 2, in the DREG-CMD message, a Management Message Type field is used for identifying MAC management messages defined in the IEEE 802.16 standard. An Action Code field is used to indicate a purpose of the DREG-CMD message, and its code values related to the idle mode include 0x05, 0x06, and 0x07. Action Code=0x05 indicates that the serving BS approves the idle mode request from the MS. Action Code=0x06 indicates that the serving BS commands the MS to retransmit the DREG-REQ message after a lapse of time indicated by a TLV_REG-duration field. Action Code=0x07 indicates that the serving BS commands the MS to wait until the DREG-CMD message is retransmitted. A TLV_Paging Information field includes Paging Group ID (PG-ID), PAGING_CYCLE and PAGING_OFFSET parameters, all of which are related to the idle mode operation. The PG-ID parameter is assigned by the system according to a location of the MS. That is, the PG-ID parameter represents the current location information of the MS.

The PAGING_CYCLE parameter indicates a paging cycle determined by the system and based on a paging cycle request from the MS. The PAGING_OFFSET parameter is used when the system determines a time at which it can page a particular MS through a frame number of the BS and the PAGING_CYCLE parameter. A TLV_REG-duration field, which is provided for Action Code=0x06, is used for indicating a time at which the MS can retransmit the DREQ-REQ message. A TLV_HMAC Tuple field is an information field used for authenticating the current serving BS based on information on the SA made between MSs and the serving BS.

The DREG-CMD message is generally transmitted from the BS to the MS in response to the DREG-REQ message. However, in order to command the MS to transition to the idle mode, the BS may transmit the DREG-CMD message as an unsolicited message even when it has not received a transition request to the idle mode from the MS through the DREG-REQ message.

Therefore, the MS's transition to the idle mode is performed at the request of either the MS or the BS. Accordingly, the BS, determining that the MS has transitioned to the idle mode, holds for a predetermined time only the minimum connection information required by the MS for transitioning from the idle mode back to an awake mode and deletes the other unnecessary information.

The minimum connection information refers to session information of a MAC layer or its higher layers, and information related to the security and privacy. The deleted information refers to the information indicating the air interface resources of the MAC layer or its lower layers. In other words, the deleted information is connection constituent information necessary for data transmission/reception in the MAC layer or its lower layers, such as a connection identifier that will be described below.

A format of the connection identifier is shown in Table 3.

TABLE 3

| CID | Value | Description |
| --- | --- | --- |
| Initial Ranging | 0x0000 | Used by an SS during initial ranging as part of network entry process |
| Basic CID | 0x0001~m | |
| Primary Management CIDs | m+1~2m | |
| Transport CIDs and Secondary Management CIDs | 2m+1~0xFEFF | |
| Multicast Polling CIDs | 0xFF00~0xFFFE | An SS may be included in one or more multicast groups for the purposes of obtaining bandwidth via polling. These connections have no associated service flow |
| Broadcast CID | 0xFFFF | Used for broadcast information that is transmitted on a downlink to all SS |

Each of the fields shown in Table 3 will be described below. An Initial Ranging CID field indicates a connection identifier for a Ranging Request (RNG-REQ) message transmitted by an MS to the BS in order to be allocated a Primary CID and a Basic CID, and every MS should be aware of this value of 0x0000. The MS, in an association process with the BS, transmits an RNG-REQ message to inform the BS of its own MAC address. The BS maps the MAC address of the MS and connection identifiers indicating the MS, i.e., a Primary Management CID and a Basic CID, with the MS.

In addition, the connection identifiers include Broadcast CID, Multicast polling CID, Transport CID, Secondary Management CID, etc.

Although the connection identifiers are used for a header of a MAC frame for identification of the connection as can be understood from Table 3, they can also be used for a MAC Service Data Unit (SDU), like the connection identifiers used for a Traffic Indication (TRF-IND) message.

The BS deletes the connection identifier information of the MS that has transitioned to the idle mode. Therefore, in order to resume data communication in an upper session over the MAC layer, an MS in the idle mode must be reallocated the connection identifiers from the BS. To this end, the MS needs to perform a network re-entry process with the BS. In other words, the MS requires the network re-entry process in order to transition from the idle mode to the awake mode, i.e., a normal service state.

FIG. 1 is a signaling diagram illustrating an MS-initiated state transition process to the idle mode in a conventional BWA communication system.

Referring to FIG. 1, if an MS 100 in the awake mode desires to transition to the idle mode in step 111, the MS 100 transmits a DREG-REQ message with De-Registration_Request_Code='0x01' to a BS 150 in step 113. The De-Registration_Request_Code='0x01' indicates that the MS 100 requests transition to the idle mode. At the time of the DREG-REQ message transmission, the MS 100 activates (or starts) a T32 Timer in step 127. The T32 Timer indicates a time for which the MS 100 waits for receipt of a DREG-CMD message from the BS 150 after transmitting the DREG-REQ message. If the T32 Timer expires, the MS 100 retransmits the DREG-REQ message to the BS 150, determining that the BS 150 has failed to receive the DREG-REQ message.

Upon receiving the DREG-REQ message from the MS 100, the BS 150 transmits a DREG-CMD message to the MS 100 in step 115, determining that the MS 100 desires to transition to the idle mode. The BS 150 transmits the DREG-CMD message to the MS 100, to allow the MS 100 to transition to the idle mode. In this case, an Action Code field in the DREG-CMD message is set to '0x05' to indicate approval of the transition request to the idle mode from the MS 100.

Thereafter, after step 115, the BS 150 holds only the minimum information (session information of upper layers and security information) for the MS 100, and deletes all the other connection information related to an air interface of the MAC layer or its lower layers, in step 125. Herein, the BS 150 starts a Management Resource Holding Timer in step 119 and deletes the connection information in step 125 at a time when the Timer expires in step 123, instead of immediately deleting the connection information. This is to hold information on the MS 100 for a predetermined time, in order to process a possible urgent transmission message from the MS 100 or to allow the MS 100 to smoothly re-enter the awake mode without the network re-entry process. The Management Resource Holding Timer is started or reset during transmission of the DREG-CMD message.

Upon receiving the DREG-CMD message from the BS 150, the MS 100 ends the T32 Timer in step 129 and transitions to the idle mode in step 117, thus minimizing power consumption.

FIG. 2 is a signaling diagram illustrating a BS-initiated state transition process to the idle mode in a conventional BWA communication system.

Before a description of FIG. 2 is given, it should be noted that the DREG-CMD message is an unsolicited message used by the BS to command the MS to transition to the idle mode even though there is no separate transition request to the idle mode from the MS.

Referring to FIG. 2, a BS 250 transmits in step 211 a DREG-CMD message to command an MS 200 in the awake mode (in step 223) to transition to the idle mode. At the same time, the BS 250 starts a Management Resource Holding Timer in step 213, and deletes connection information for the MS 200 in step 221 when the Timer expires in step 219. That is, the BS 250 transmits the DREG-CMD message, taking into consideration that the MS 200 will transition to the idle mode.

Upon receiving the DREG-CMD message from the BS 250 in step 211, the MS 200 transitions to the idle mode in step 215.

FIG. 3 is a signaling diagram illustrating a conventional operation performed when an MS fails to receive a DREG-CMD message.

Referring to FIG. 3, if an MS 300 desires to transition from the awake mode to the idle mode in step 311, the MS 300 transmits a DREG-REQ message with De-Registration_Request_Code='0x01' to a BS 350 in step 315. At the time of the DREG-REQ message transmission, the MS 300 starts a T32 Timer in step 313, and then waits until the T32 Timer expires for receipt of a DREG-CMD message from the BS 350.

Upon receiving the DREG-REQ message from the MS 300, the BS 350 transmits in step 319 a DREG-CMD message to the MS 300 in response to the received DREG-REQ message. In this case, an Action Code field in the DREG-CMD message is set to '0x05' to indicate approval of the transition request to the idle mode from the MS 300. While transmitting the DREG-CMD message, the BS 350 starts a Management Resource Holding Timer in step 317, instead of immediately deleting connection information for the MS 300.

However, if the DREG-CMD message transmitted by the BS 350 fails to correctly arrive at the MS 300 in step 319, the T32 Timer expires in step 321. The MS 300 retransmits the DREG-REQ message to the BS 350 in step 323, since the DREG-REQ message transmitted in step 315 has failed to correctly arrive at the BS 350. At this time, the T32 Timer also restarts in step 321.

The BS 350 transmits a DREG-CMD message in step 325 in response to the DREG-REQ message received in step 323. However, if the MS 300 fails to normally receive even the DREG-CMD message transmitted in step 325, the MS 300 and the BS 350 repeat the operations in steps 315 through 323.

In other words, if the MS 300 fails to receive the DREG-CMD message from the BS 350 in response to the DREG-REQ message, the MS 300 repeatedly retransmits the DREG-REQ message each time the T32 Timer expires, as many times as the preset number of retransmissions.

If the number of retransmissions for the DREG-REQ message exceeds the preset number of retransmissions, the MS 300 initializes a MAC state with the BS 350 (MAC re-initialization) in steps 337 and 339, determining that communication with the BS 350 is dropped. Accordingly, the MS 300 performs a network re-entry process with the BS 350 or another BS.

The BS 350, since it never received the DREG-REQ message from the MS 300, deletes all connection information for the MS 300 in step 343 when the Management Resource Holding Timer expires in step 341.

As described with reference to FIG. 3, if an MS fails to normally receive a DREG-CMD message from a BS in response to a DREG-REQ message, the MS performs MAC re-initialization, thereby acquiring state synchronization between the BS and the MS. In other words, if the BS transmits a DREG-CMD message to the MS, the BS expects that the MS will transition to the idle mode. However, the MS, if it fails to receive the DREG-CMD message, will stay in the awake mode, causing state mismatch between the BS and the MS. However, due to the MAC re-initialization operation of the MS in step 339, state synchronization between the BS and the MS is reacquired.

FIG. 4 is a signaling diagram for a description of possible problems occurring when a conventional BS sends an unsolicited state transition request to the idle mode.

Referring to FIG. 4, a BS 450 transmits an unsolicited DREG-CMD message to an MS 400 in step 413 to command the MS 400 in the awake mode (in step 411) to transition to the idle mode. At the same time, the BS 450, as it expects that the MS 400 will transition to the idle mode, starts a Management Resource Holding Timer in step 415 and deletes connection information for the MS 400 in step 421 if the Timer expires in step 419.

However, the MS 400 will continue to hold the awake mode if it fails to receive the DREG-CMD message from the BS 450. Therefore, the BS 450 will delete the connection information for the MS 400 if the started Management Resource Holding Timer expires in step 419. This means that the BS 450 deletes all connection information for the MS 400, making communication between the MS 400 and the BS 450 impossible.

To make the communication between the MS 400 and the BS 450 possible, the MS 400 needs to perform a network re-entry process with the BS 450. However, the MS 400 does not perform the network re-entry process, because the MS 400 is still under the assumption that it should sill operate in the awake mode. Thereafter, if the MS 400 performs data transmission to the BS 450 in the awake mode in step 423, the BS 450 disregards the message transmitted by the MS 400 in step 425 because it has no connection information for the MS 400.

The BS 450 can allocate the deleted connection information, i.e., connection identifier, for the MS 400 to another MS that performs an initialization process to the BS 450. For example, if a connection identifier used by a first MS is '1', the BS 450 can allocate the connection identifier '1' to a second MS as described above, if the BS 450 deletes the connection information for the first MS. Therefore, the first MS and the second MS hold the same connection identifier, and perform data transmission/reception using the connection identifier. As a result, when the first MS transmits data using the connection identifier '1', the BS 450 may mistake the data for one transmitted by the second MS. Also, when the BS 450 transmits data to the second MS, the first MS may mistake the data for data transmitted thereto. Accordingly, there is a need for a scheme for acquiring state synchronization between a BS and an MS transitioning from the awake mode to the idle mode.

SUMMARY OF THE INVENTION

It is, therefore, an object of the present invention to provide a system and method for acquiring state synchronization between a BS and an MS in a BWA communication system.

According to one aspect of the present invention, there is provided a method for controlling an idle mode in a broadband wireless access (BWA) communication system. The method includes the steps of transmitting to a mobile station (MS), by a base station (BS), a de-registration command for commanding state transition to the idle mode; and transmitting, by the MS, a response to the de-registration command.

According to another aspect of the present invention, there is provided a method for controlling an idle mode by a base station (BS) in a broadband wireless access (BWA) communication system. The method includes the steps of transmitting to a mobile station (MS) a de-registration command (DREG-CMD) for commanding state transition to the idle mode; and receiving a response to the de-registration command.

According to further another aspect of the present invention, there is provided a method for controlling an idle mode by a mobile station (MS) in a broadband wireless access (BWA) communication system. The method includes the steps of receiving from a base station (BS) a de-registration command indicating a state transition command to the idle mode; and transmitting to the BS a response to the deregistration command.

According to yet another aspect of the present invention, there is provided a method for controlling an idle mode in a broadband wireless access (BWA) communication system. The method includes the steps of transmitting to a base station (BS), by a mobile station (MS), a de-registration request (DREG-REQ) indicating a state transition request to the idle mode; transmitting to the MS, by the BS, a de-registration command (DREG-CMD) for commanding state transition to the idle mode; and transmitting to the BS, by the MS, a response message to the DREG-CMD.

According to still another aspect of the present invention, there is provided a system for controlling an idle mode in a broadband wireless access (BWA) communication system including a base station (BS) and a mobile station (MS). The system includes a BS for transmitting to the MS a de-registration command (DREG-CMD) for commending state transition to the idle mode; and a MS for transmitting to the BS a response message to the DREG-CMD.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENTS

Figure 1:
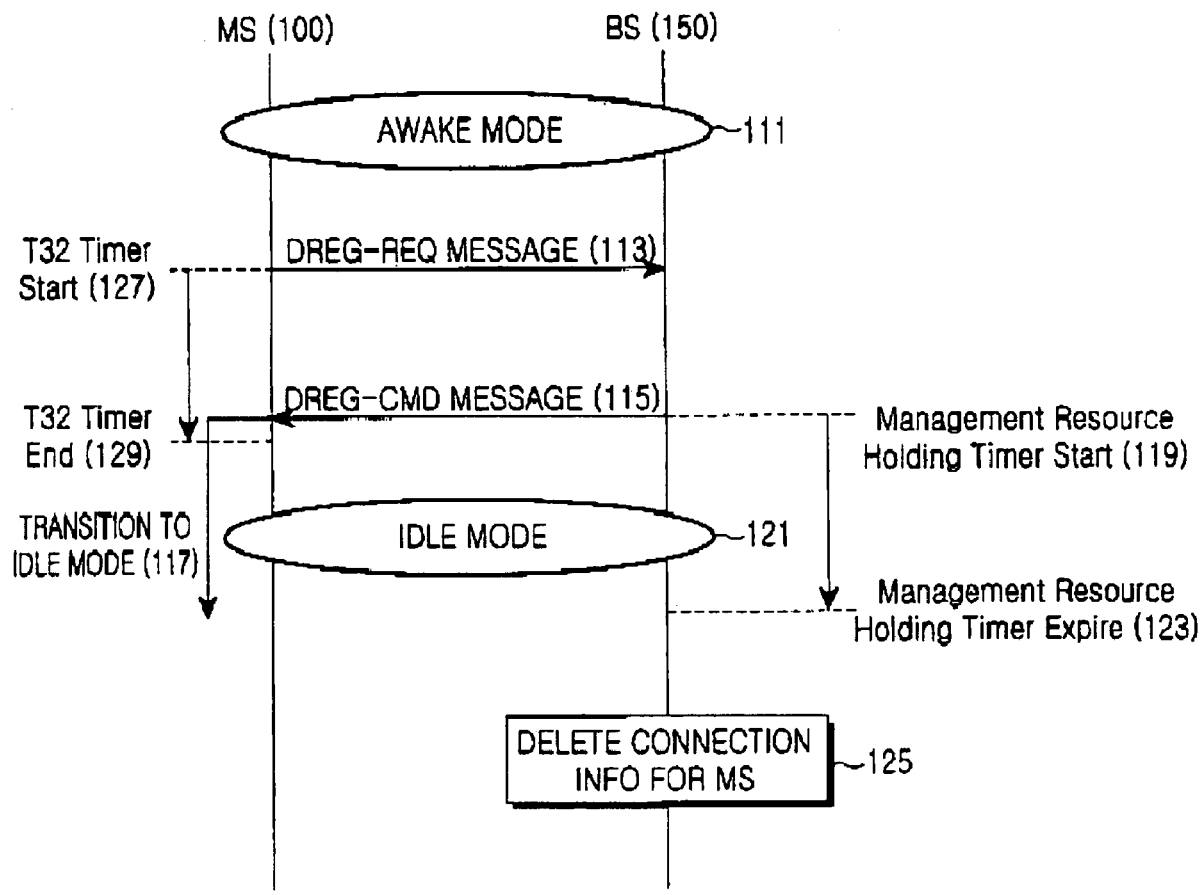
FIG. 1 is a signaling diagram illustrating an MS-initiated state transition process to the idle mode in a conventional BWA communication system.
Figure 2:
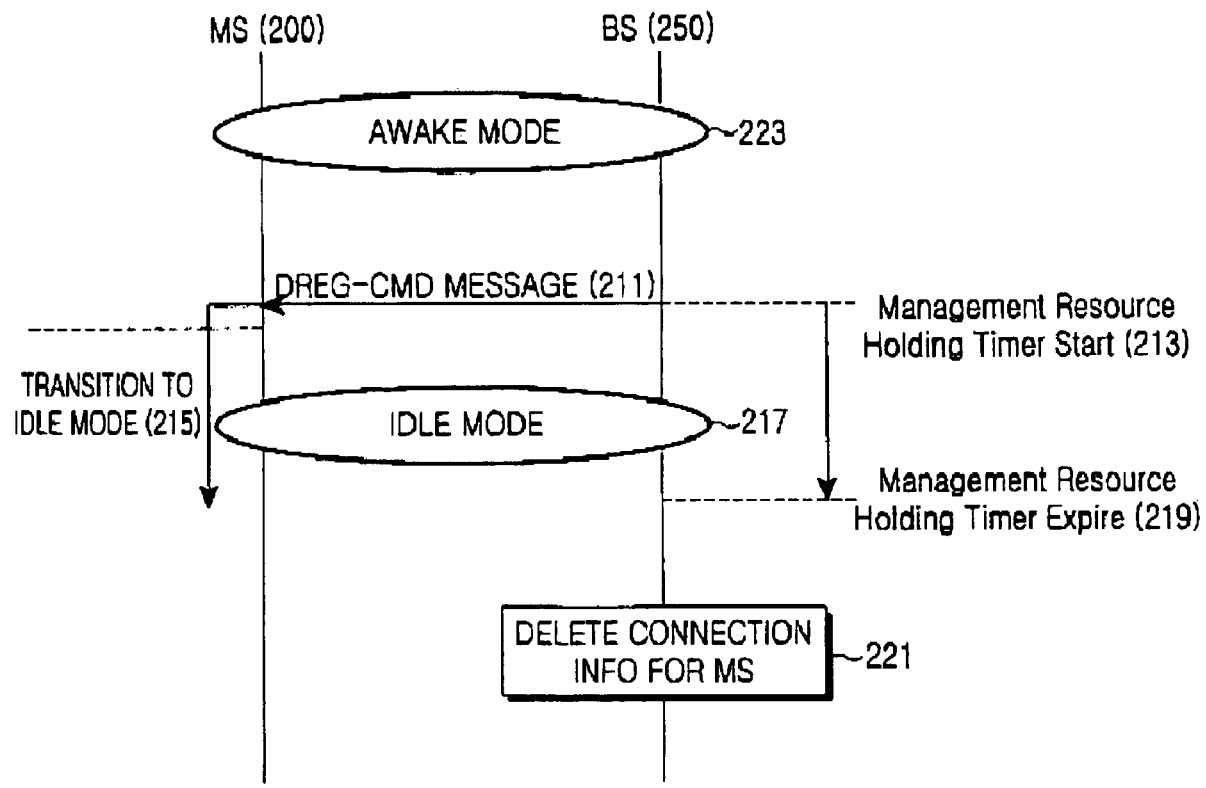
FIG. 2 is a signaling diagram illustrating a BS-initiated state transition process to the idle mode in a conventional BWA communication system.

Several exemplary embodiments of the present invention will now be described in detail with reference to the annexed drawings. In the following description, a detailed description of known functions and configurations incorporated herein has been omitted for clarity and conciseness.

The present invention proposes a system and method for acquiring state synchronization between a base station (BS) and a mobile station (MS) in An Institute of Electrical and Electronics Engineers (IEEE) 802.16 communication system, which is one of the typical Broadband Wireless Access (BWA) communication systems, wherein if the BS transmits a De-Registration Command (DREG-CMD) message to the MS, the MS transmits an acknowledgement message indicating receipt of the DREG-CMD message to the BS. For convenience, an embodiment of the present invention will be described with reference to Orthogonal Frequency Division Multiple Access (OFDMA) communication system, as an example of the foregoing communication system. The present invention can also be applied to other communication systems as well as the OFDMA communication system.

Therefore, the present invention newly proposes a De-Registration-Acknowledgement (DREG-ACK) message transmitted by the MS in response to the DREG-CMD message. Herein, the term "DREG-ACK message" will be used as an example, and may include any message that an MS transmits to a BS in response to a transition command from the BS in order to inform that it has normally received the transition command from the BS. As the DREG-ACK message is newly proposed, the BS starts a DREG-ACK Response Timer indicating a waiting time for the DREG-ACK message when transmitting the DREG-CMD message to the MS. In addition, each time the DREG-ACK Response Timer expires, the BS retransmits the DREG-CMD message, assuming that the MS has failed to receive the DREG-CMD message. Therefore, the BS retransmits the DREG-CMD message as many times as a preset number of retransmissions for the DREG-CMD message, i.e., a DREG-CMD Retries Count value.

A format of the DREG-ACK message newly proposed in the present invention is shown in Table 4.

TABLE 4

| SYNTAX | SIZE |
|---|---|
| DREG-ACK Message_Format ( ) { | |
|     MANAGEMENT MESSAGE TYPE = xx | 8 bits |
|     Action Code from BS | 8 bits |
|     TLV_HMAC Tuple | 176 bits |
| } | |

As shown in Table 4, a Management Message Type field is used for identifying Medium Access Control (MAC) management messages defined in the IEEE 802.16 standard. An Action Code from BS field is used for recording therein an Action Code value of a DREG-CMD message received from a BS. If the DREG-CMD message is an unsolicited DREG-CMD message, '0x05' is recorded in the Action Code from BS field. A TLV_HMAC Tuple field is an authentication field based on the information of the Security Association (SA) made between the MS and the current serving BS.

A description will now be made of the parameters newly proposed in the BS, i.e., DREG-ACK Response Timer and DREG-CMD Retries Count parameters.

The DREG-ACK Response Timer indicates a possible waiting time spanning from a time at which the BS transmits to an MS a DREG-CMD message until a time at which the BS receives a DREG-ACK message from the MS. The DREG-ACK Response Timer starts at a time when the BS transmits the DREG-CMD message, and if the DREG-ACK Response Timer expires, the BS retransmits the DREG-CMD message and restarts the DREG-ACK Response Timer.

Each time the DREG-ACK Response Timer expires, the BS retransmits the DREG-CMD message, assuming that the MS has failed to receive the DREG-CMD message. The BS increases the DREG-CMD Retries Count by one each time it retransmits the DREG-CMD message, and no longer transmits the DREG-CMD message to the MS at a time when the increased DREG-CMD Retries Count value exceeds a predetermined number (a possible value predetermined according to system implementation). In this case, the BS deletes all connection information for the MS, assuming that communication with the MS is impossible, or that the MS continues to hold the awake mode.

Figure 5:
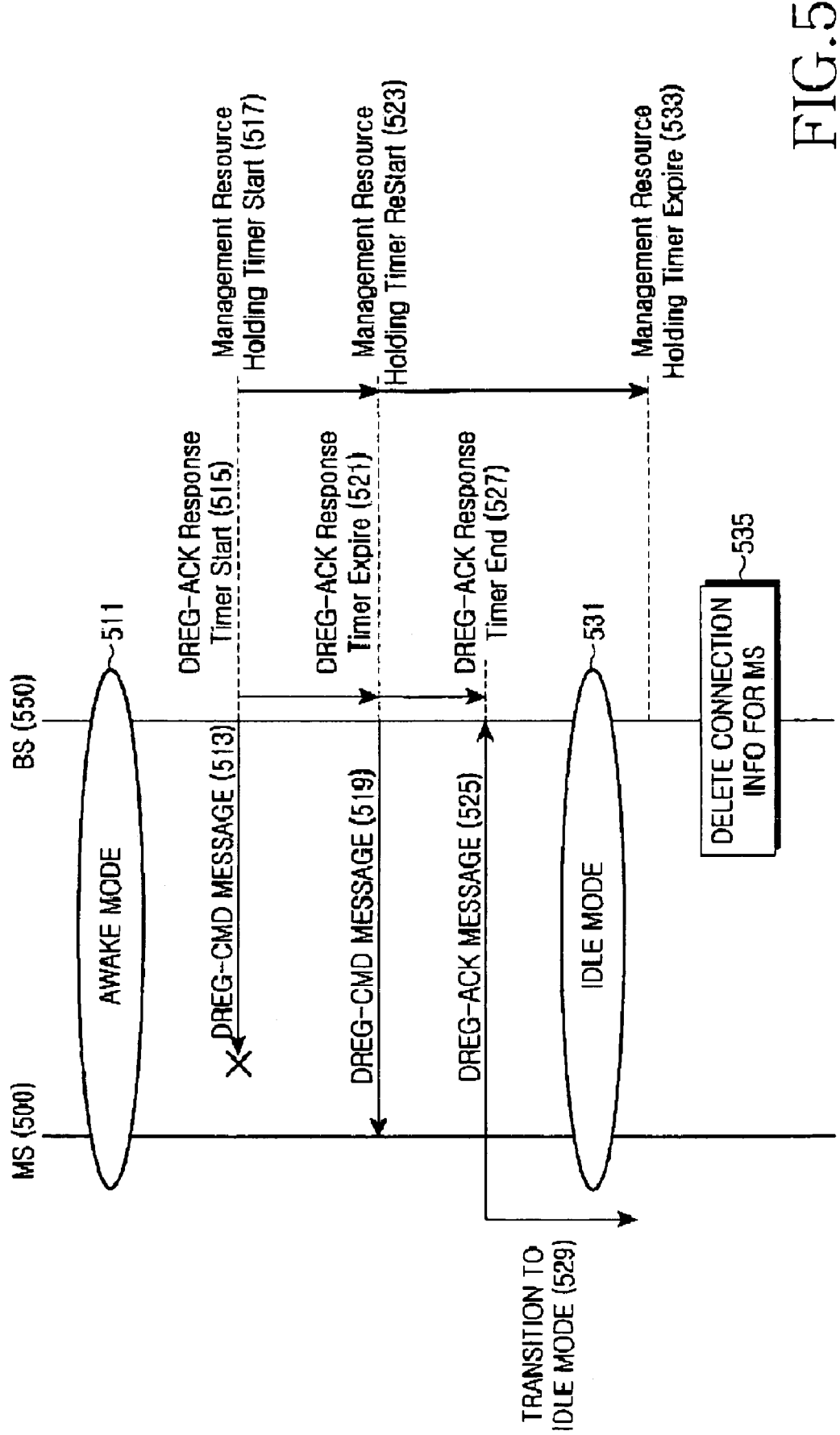
FIG. 5 is a signaling diagram illustrating a de-registration process between a BS and an MS in a BWA communication system according to a first embodiment of the present invention.

FIG. 5 is a signaling diagram illustrating a de-registration process between a BS and an MS in a BWA communication system according to a first embodiment of the present invention.

Referring to FIG. 5, a BS 550 transmits a DREG-CMD message to an MS 500 in step 513 in order to command the MS 500 in the awake mode (in step 511) to transition to the idle mode for minimizing power consumption of the MS 500. At the time of the DREG-CMD message transmission, the BS 550 starts a Management Resource Holding Timer, and a DREG-ACK Response Timer newly proposed in the present invention in steps 515 and 517, respectively.

If the MS 500 fails to receive the DREG-CMD message transmitted by the BS 550 in step 513 due to, for example, a bad channel state, the MS 500 continues to hold the awake mode.

At a time when the DREG-ACK Response Timer expires in step 521, the BS 550 retransmits the DREG-CMD message in step 519. As the BS 550 retransmits the DREG-CMD message, the Management Resource Holding Timer also restarts in step 523. A DREG-CMD Retries Count value in step 519 is greater by 1 than a previous DREG-CMD Retries Count value in step 513.

Upon receiving the DREG-CMD message from the BS 550, the MS 500 transmits a DREG-ACK message to the BS 550 in response to the received DREG-CMD message in step 525. At the same time, the MS 500 transitions to the idle mode in step 529, thus minimizing power consumption.

Upon receiving the DREG-ACK message, the BS 550 stops the DREG-ACK Response Timer in step 527, and determines that the MS 500 has transitioned to the idle mode. Thereafter, the BS 550 deletes connection information for the MS 500 in step 535 at a time when the Management Resource Holding Timer, restarted in step 523, automatically expires.

Figure 6:
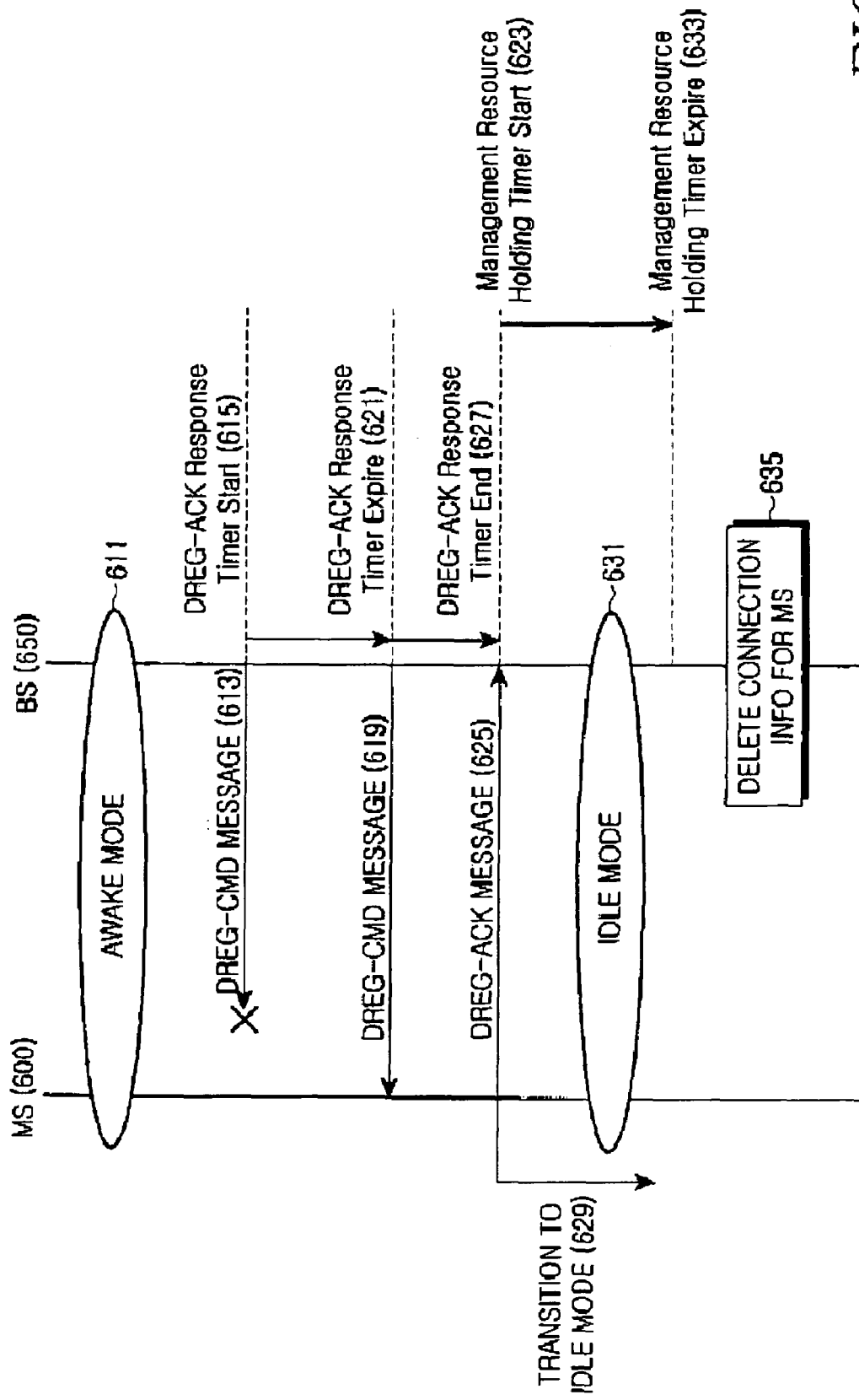
FIG. 6 is a signaling diagram illustrating a de-registration process between a BS and an MS in a BWA communication system according to a second embodiment of the present invention.

FIG. 6 is a signaling diagram illustrating a de-registration process between a BS and an MS in a BWA communication system according to a second embodiment of the present invention.

Before a description of FIG. 6 is given, it should be noted that FIG. 6 is different from FIG. 5 in terms of a starting condition of the Management Resource Holding Timer. While the Management Resource Holding Timer starts or restarts each time a DREG-CMD message is transmitted or retransmitted in FIG. 5, the Management Resource Holding Timer starts only when a DREG-ACK message is received from an MS in FIG. 6.

Referring to FIG. 6, a BS 650 transmits a DREG-CMD message to an MS 600 in step 613, in order to command the MS 600 in the awake mode (in step 611) to transition to the idle mode. At the time of the DREG-CMD message transmission, the BS 650 starts a DREG-ACK Response Timer in step 615.

If the MS 600 fails to receive the DREG-CMD message transmitted by the BS 650 in step 613, it continues to hold the awake mode.

At a time when the DREG-ACK Response Timer expires in step 621, the BS 650 retransmits the DREG-CMD message in step 619. A DREG-CMD Retries Count value in step 619 is greater by 1 than a previous DREG-CMD Retries Count value in step 613.

Upon receiving the DREG-CMD message from the BS 650, the MS 600 transmits a DREG-ACK message to the BS 650 in response to the received DREG-CMD message in step 625. At the same time, the MS 600 transitions to the idle mode in step 629, thus minimizing power consumption.

Upon receiving the DREG-ACK message, the BS 650 ends the DREG-ACK Response Timer in step 627, and at the same time, starts the Management Resource Holding Timer in step 623. At this time, the BS 650 assumes that the MS 600 has transitioned to the idle mode. Thereafter, the BS 650 deletes connection information for the MS 600 in step 635 at a time when the Management Resource Holding Timer automatically expires in step 633.

Figure 7:
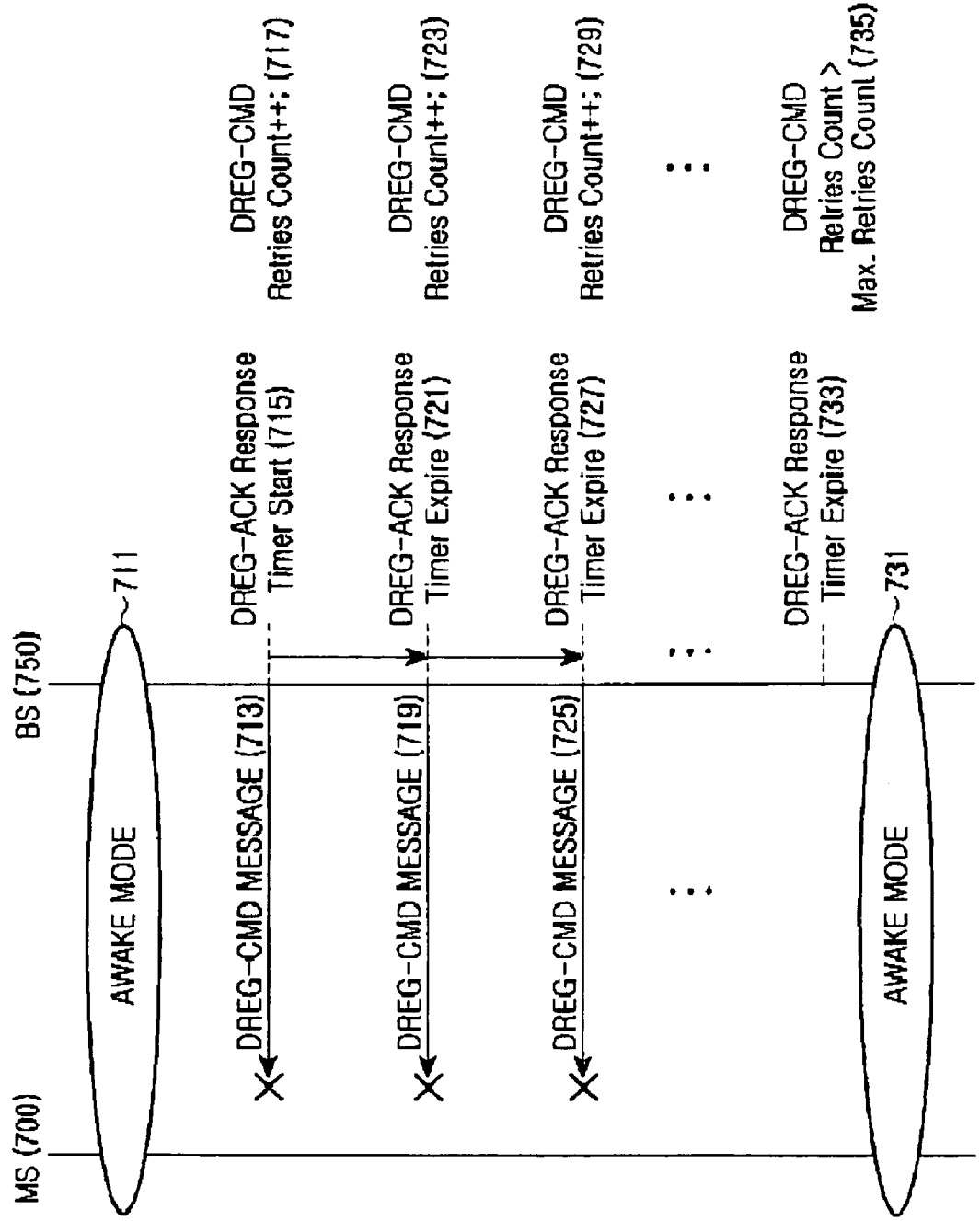
FIG. 7 is a signaling diagram illustrating a de-registration process performed when a BS fails to receive a DREG-ACK message in response to a transmitted DREG-CMD message according to an embodiment of the present invention.

FIG. 7 is a signaling diagram illustrating a de-registration process performed when a BS fails to receive a DREG-ACK message in response to a transmitted DREG-CMD message according to an embodiment of the present invention.

Referring to FIG. 7, a BS 750 transmits a DREG-CMD message to an MS 700 in step 713. At the same time, the BS 750 starts a DREG-ACK Response Timer in step 715, and increases a DREG-CMD Retries Count value by 1 in step 717.

It will be assumed herein that a starting time of the Management Resource Holding Timer of the BS 750 is equal to one of those described with reference to FIGS. 5 and 6.

Thereafter, the BS 750 retransmits the DREG-CMD message in step 719 at a time when the DREG-ACK Response Timer expires. At the same time, the BS 750 restarts the DREG-ACK Response Timer in step 721, and increases again the DREG-CMD Retries Count value by 1 in step 723.

Again, the BS 750 retransmits the DREG-CMD message at a time when the DREG-ACK Response Timer expires in step 727. At the same time, the BS 750 restarts the DREG-ACK Response Timer in step 727, and increases again the DREG-CMD Retries Count value by 1 in step 729.

In steps 713 through 729, even though the BS 750 transmits the DREG-CMD message to the MS 700, the MS 700 fails to receive the DREG-CMD message, so the DREG-ACK Response Timer of the BS 750 repeatedly expires/restarts and the DREG-CMD Retries Count increases by one at each retransmission.

As described above, if the number of retransmissions for the DREG-REQ message exceeds the preset number of retransmissions in step 735, the BS 750 no longer transmits a state transition request to the idle mode to the MS 700. Accordingly, the BS 750 can either assumes that the MS 700 continues to hold the awake mode, or delete all connection information for the MS 700, assuming that communication with the MS 700 is dropped.

Figure 3:
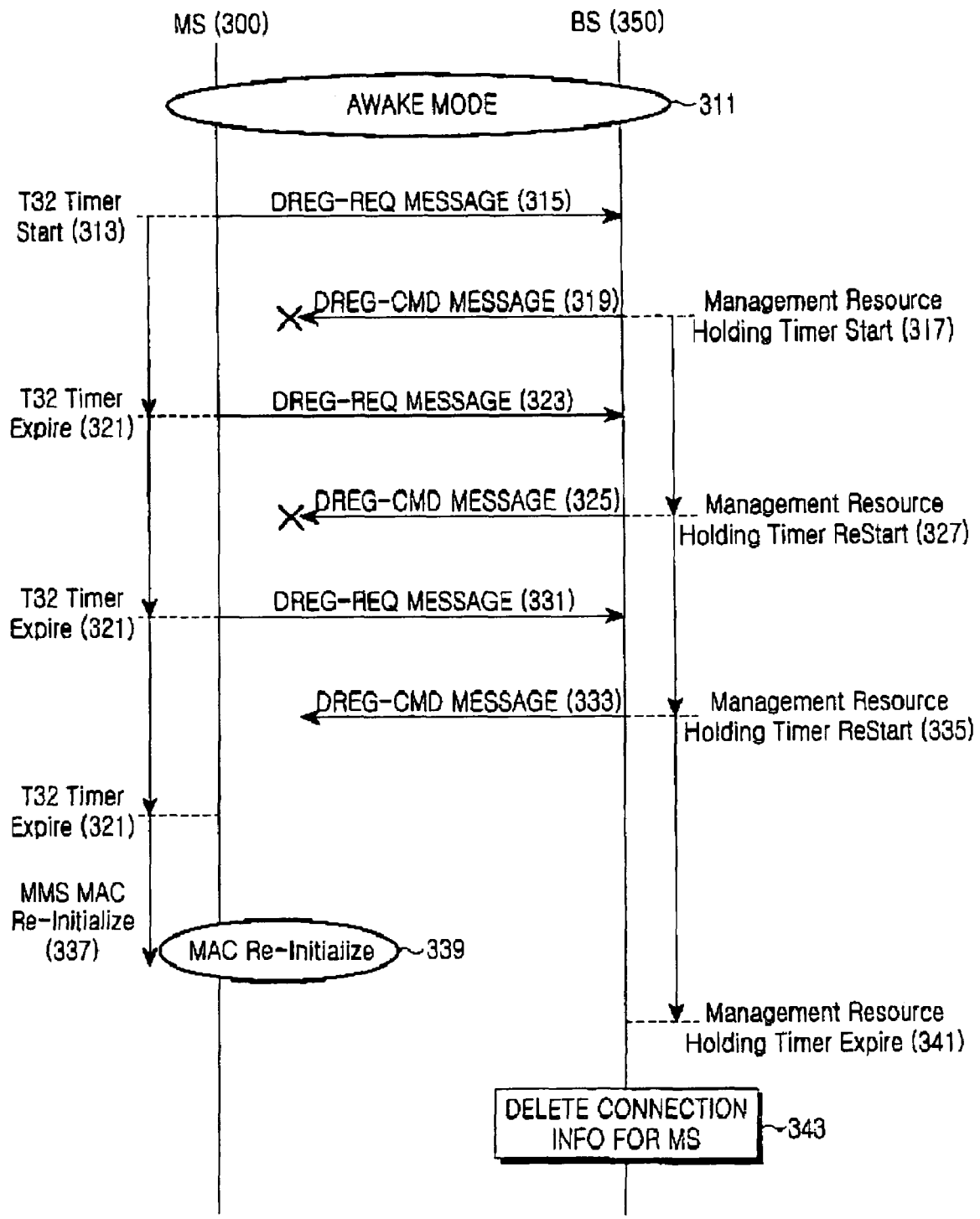
FIG. 3 is a signaling diagram illustrating a conventional operation performed when an MS fails to receive a DREG-CMD message.
Figure 4:
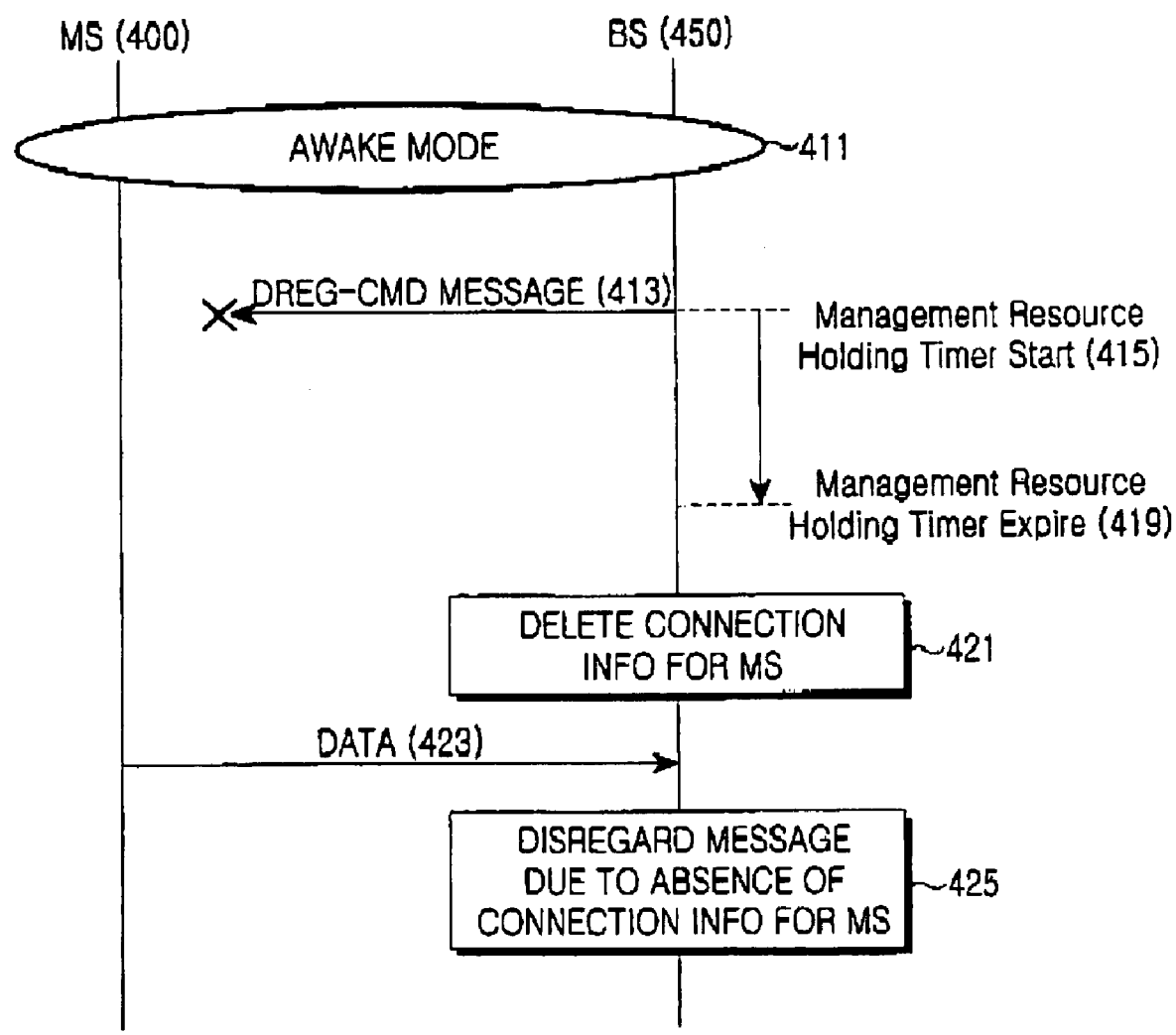
FIG. 4 is a signaling diagram for a description of possible problems occurring when a conventional BS sends an unsolicited state transition request to the idle mode.

Although an embodiment of the present invention has been described for the case where the MS fails to normally receive the DREG-CMD message transmitted by the BS in FIGS. 5 through 7, the same can also be applied to the case where the BS fails to normally receive the DREG-ACK message transmitted by the MS in response to the DREG-CMD message. In addition, if the MS initiates transmission of a DREG-REQ message to the BS and the BS transmits a DREG-CMD message to the MS as described with reference to FIGS. 1 and 3, the MS may transmit a DREG-ACK message in response to the DREG-CMD message.

Figure 8:
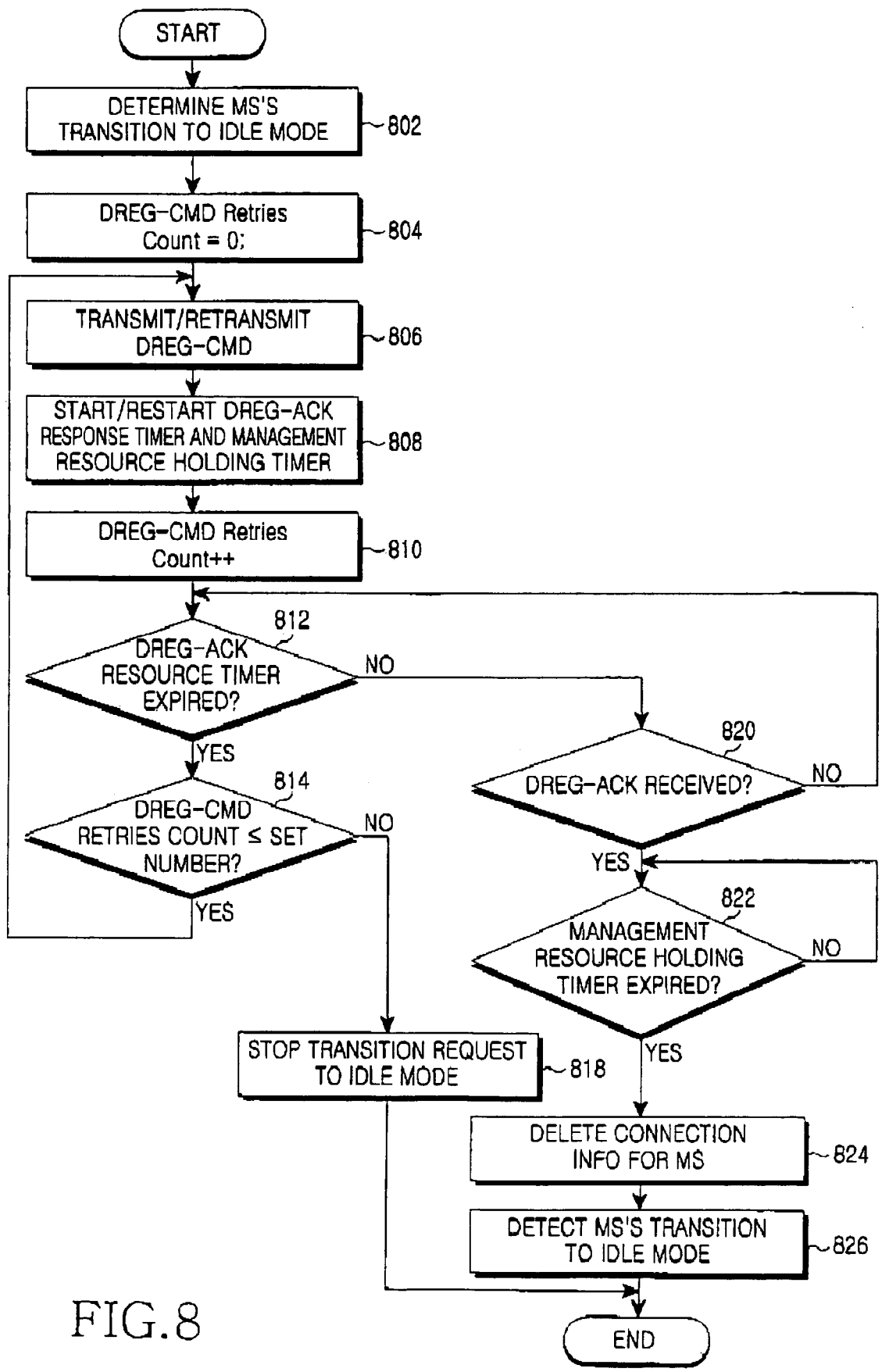
FIG. 8 is a flowchart illustrating a de-registration process with an MS performed by a BS according to an embodiment of the present invention.

FIG. 8 is a flowchart illustrating a de-registration process with an MS performed by a BS according to an embodiment of the present invention.

Referring to FIG. 8, a BS determines that a MS needs a state transition to the idle mode in step 802, and initializes a DREG-CMD Retries Count value to '0' in step 804. The BS transmits a DREG-CMD message to an MS in step 806. At the time of the DREG-CMD message transmission, the BS starts a DREG-ACK Response Timer and a Management Response Holding Timer in step 808. The BS increases the DREG-CMD Retries Count value by 1 in step 810. The BS determines in step 812 if the DREG-ACK Response Timer has expired. If the DREG-ACK Response Timer has expired, the BS proceeds to step 814. Otherwise, if the DREG-ACK Response Timer has not expired, the BS proceeds to step 820.

In step 814, the BS compares the DREG-CMD Retires Count value with a preset number. If the DREG-CMD Retries Count value is less than or equal to the preset number, the BS proceeds to step 806 where it retransmits the DREG-CMD message. However, if the DREG-CMD Retries Count value is greater than the preset number, the BS proceeds to step 818.

In step 818, the BS no longer performs the MS state transition to the idle mode, as the DREG-CMD Retires Count value exceeds the preset number.

In step 820, the BS waits for receipt of a DREG-ACK message until the DREG-ACK Response Timer expires. Upon receipt of the DREG-ACK message, the BS proceeds to step 822, and upon failure to receive the DREG-ACK message, the BS proceeds to step 812.

In step 822, the BS determines if the Management Resource Holding Timer has expired. If the Management Resource Holding Timer has expired, the BS proceeds to step 824 where it deletes connection information for the MS due to the expiration of the Management Resource Holding Timer. The BS assumes in step 826 that the MS has transitioned to the idle mode.

Figure 9:
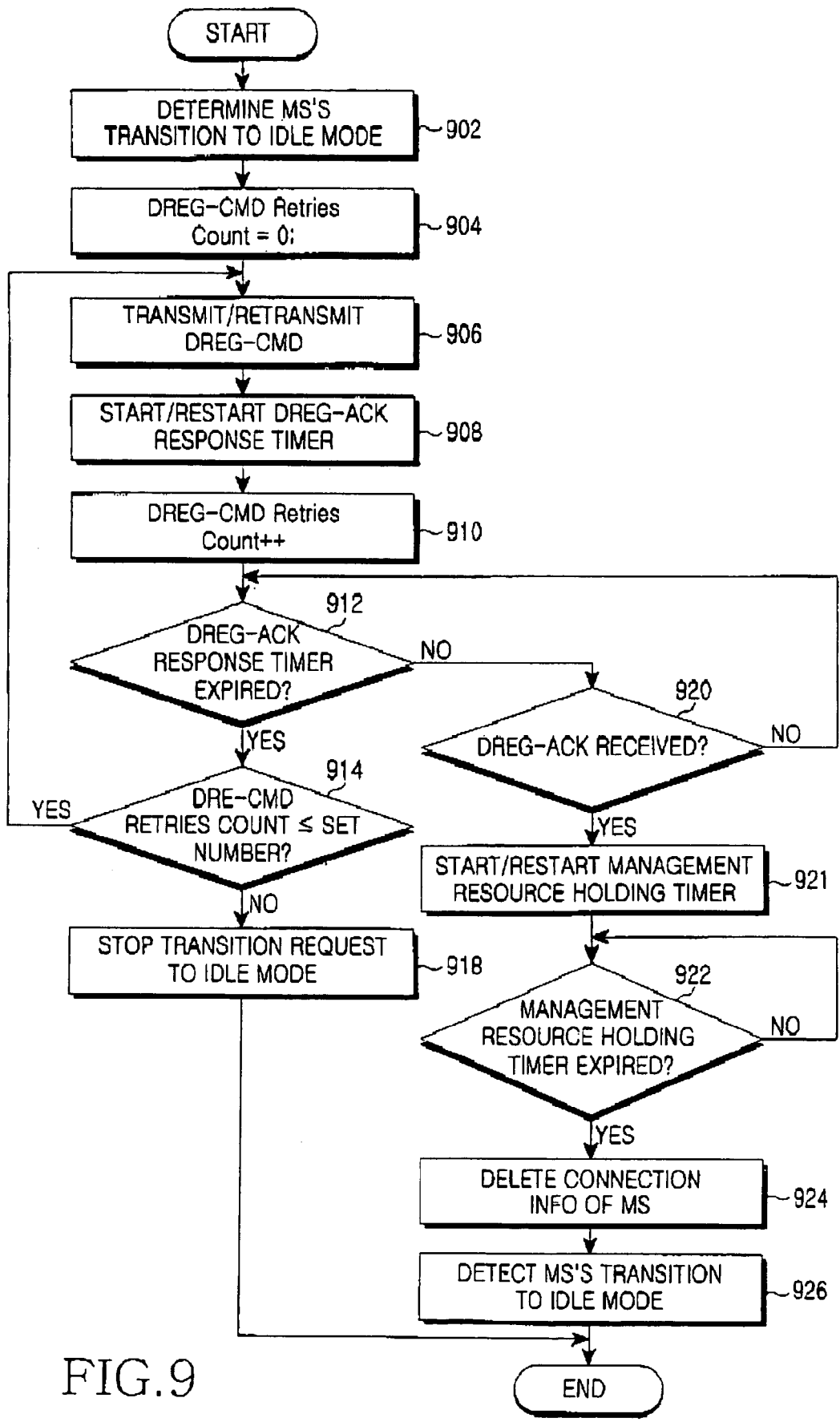
FIG. 9 is a flowchart illustrating a de-registration process with an MS performed by a BS according to an embodiment of the present invention.

FIG. 9 is a flowchart illustrating a de-registration process with an MS performed by a BS according to an embodiment of the present invention.

Referring to FIG. 9, a BS determines that a MS needs a state transition to the idle mode in step 902, and initializes a DREG-CMD Retries Count value to '0' in step 904. The BS transmits a DREG-CMD message to an MS in step 906. At the time of the DREG-CMD message transmission, the BS starts a DREG-ACK Response Timer in step 908. The BS increases the DREG- CMD Retries Count value by 1 in step 910. The BS determines in step 912 if the DREG-ACK Response Timer has expired. If the DREG-ACK Response Timer has expired, the BS proceeds to step 914. Otherwise, if the DREG-ACK Response Timer has not expired, the BS proceeds to step 920.

In step 914, the BS compares the DREG-CMD Retires Count value with a preset number. If the DREG-CMD Retries Count value is less than or equal to the preset number, the BS proceeds to step 906. However, if the DREG-CMD Retries Count value is greater than the preset number, the BS proceeds to step 918.

In step 918, the BS no longer performs the MS state transition to the idle mode, as the DREG-CMD Retires Count value exceeds the preset number.

In step 920, the BS waits for receipt of a DREG-ACK message until the DREG-ACK Response Timer expires. Upon receipt of the DREG-ACK message, the BS proceeds to step 921, and upon failure to receive the DREG-ACK message, the BS proceeds to step 912.

In step 921, the BS starts the Management Resource Holding Timer, as it received the DREG-ACK message. In step 922, the BS determines if the Management Resource Holding Timer has expired. If the Management Resource Holding Timer has expired, the BS proceeds to step 924 where it deletes connection information for the MS due to the expiration of the Management Resource Holding Timer. The BS assumes in step 926 that the MS has transitioned to the idle mode.

As can be understood from the foregoing description, in the BWA communication system according to the present invention, a BS transmits a DREG-CMD message to an MS to command the MS to transition to the idle mode, and the MS transmits a DREG-ACK message to the BS upon receiving the DREG-CMD message, thereby acquiring state synchronization between the BS and the MS. In this manner, it is possible to prevent mis-operation caused by state mismatch.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for controlling an idle mode by a mobile station (MS) in a broadband wireless access (BWA) communication system, the method comprising:
   receiving, from a base station (BS), an unsolicited de-registration command (DREG-CMD) message for commanding state transition to the idle mode from an awake mode; and
   transmitting a response message to the DREG-CMD message to the BS,
   wherein the BS releases connection information with the MS in the idle mode, upon receipt of the response message and expiration of a management resource holding timer, and
   wherein the management resource holding timer is started when the DREG-CMD message is transmitted by the BS.

2. The method of claim 1, wherein the connection information includes information on a connection identifier uniquely used between the BS and the MS.

3. The method of claim 1, wherein the connection information includes information on a connection identifier commonly used between the BS and a plurality of MSs.

4. The method of claim 1, further comprising the step of:
   transitioning to the idle mode, after transmitting the response message.

5. A method for controlling an idle mode by a base station (BS) in a broadband wireless access (BWA) communication system, the method comprising:
   transmitting to a mobile station (MS) an unsolicited de-registration command (DREG-CMD) message for commanding a state transition to the idle mode from an awake mode;
   starting a first timer to wait for receipt of a response message from the MS, when transmitting the DREG-CMD message;
   starting a management resource holding timer to count a time to maintain connection information with the MS, when transmitting the DREG-CMD message;
   retransmitting the DREG-CMD message, when the first timer expires;
   restarting the first timer to wait for receipt of the response message from the MS, when retransmitting the DREG-CMD message;
   restarting the management resource holding timer, when the BS retransmits the DREG-CMD message at an expiration of the first timer;
   increasing a DREG-CMD Retry Count value each time the BS retransmits the DREG-CMD message, until the DREG-CMD Retries Count value reaches a preset maximum number of retransmissions; and receiving, from the MS, the response message to the DREG-CMD message, wherein the BS releases the connection information with the MS in the idle mode, upon receipt of the response message and expiration of the management resource holding timer.

6. The method of claim 5, wherein the connection information includes information on a connection identifier uniquely used between the BS and the MS.

7. The method of claim 5, wherein the connection information includes information on a connection identifier commonly used between the BS and a plurality of MSs including the MS.

8. A system for controlling an idle mode in a broadband wireless access (BWA) communication system, the system comprising:

a base station (BS) for transmitting, to a mobile station (MS), an unsolicited de-registration command (DREG-CMD) message for commanding a state transition to the idle mode from an awake mode, and receiving, from the MS, a response message to the DREG-CMD message, wherein the BS starts a first timer to wait for receipt of the response message from the MS, when transmitting the DREG-CMD message, and starts a management resource holding timer to count a time to maintain connection information with the MS, when transmitting the DREG-CMD message, wherein the BS retransmits the DREG-CMD message, when the first timer expires, restarts the first timer to wait for receipt of the response message from the MS, when retransmitting the DREG-CMD message, and restarts the management resource holding timer, when the BS retransmits the DREG-CMD message at an expiration of the first timer, wherein the BS increases a DREG-CMD Retry Count value each time the BS retransmits the DREG-CMD message, until the DREG-CMD Retries Count value reaches a preset maximum number of retransmissions, and wherein the BS releases the connection information with the MS in the idle mode, upon receipt of the response message and expiration of the management resource holding timer.

9. The system of claim 8, wherein the connection information includes information on a connection identifier uniquely used between the BS and the MS.

10. The system of claim 8, wherein the connection information includes information on a connection identifier commonly used between the BS and a plurality of MSs including the MS.

11. The method of claim 1, further comprising the step of:

transmitting, to the BS, a de-registration request indicating a state transition request to the idle mode, before reception of the DREG-CMD message.

12. A system for controlling an idle mode in a broadband wireless access (BWA) communication system, the system comprising:

a mobile station (MS) for receiving, from a base station (BS), an unsolicited de-registration command (DREG-CMD) message for commanding a state transition to the idle mode from an awake mode, and transmitting, to the BS, a response message to the DREG-CMD message, wherein the BS releases connection information with the MS in the idle mode, upon receipt of the response message and expiration of a management resource holding timer, and wherein the management resource holding timer is started when the DREG-CMD message is transmitted by the BS.

13. The system of claim 12, wherein the connection information includes information on a connection identifier uniquely used between the BS and the MS.

14. The system of claim 12, wherein the connection information includes information on a connection identifier commonly used between the BS and a plurality of MSs including the MS.

15. The system of claim 12, wherein the MS transitions to the idle mode, after transmitting the response message.

16. A method for controlling an idle mode by a base station (BS) in a broadband wireless access (BWA) communication system, the method comprising:

transmitting to a mobile station (MS) an unsolicited de-registration command (DREG-CMD) message for commanding a state transition to the idle mode from an awake mode;

starting a first timer to wait for receipt of a response message to the DREG-CMD message and starting a management resource holding timer to count a time to maintain connection information with the MS, when transmitting the DREG-CMD message;

retransmitting the DREG-CMD message when the first timer expires;

restarting the first timer and the management resource holding timer, when retransmitting the DREG-CMD message;

receiving, from the MS, a response message to the DREG-CMD message, before the first timer expires; and releasing the connection information when the management resource holding timer expires, after receiving the response message to the DREG-CMD message, wherein a DREG-CMD Retry Count value increases each time the BS transmits the DREG-CMD message, and wherein the DREG-CMD message is not retransmitted when the DREG-CMD Retry Count value is greater than a preset maximum number of retransmissions.

17. A system for controlling an idle mode in a broadband wireless access (BWA) communication system, the system comprising:

a base station (BS) for transmitting to a mobile station (MS) an unsolicited de-registration command (DREG-CMD) message for commanding a state transition to the idle mode from an awake mode, starting a first timer to wait for receipt of a response message to the DREG-CMD message and starting a management resource holding timer to count a time to maintain connection information with the MS, when transmitting the DREG-CMD message, retransmitting the DREG-CMD message when the first timer expires, restarting the first timer and the management resource holding timer, when retransmitting the DREG-CMD message, receiving, from the MS, a response message to the DREG-CMD message, before the first timer expires, and releasing the connection information when the management resource holding timer expires, wherein a DREG-CMD Retry Count value increases each time the BS transmits the DREG-CMD message, and wherein the DREG-CMD message is not retransmitted when the DREG-CMD Retry Count value is greater than a preset maximum number of retransmissions.

* * * * *